United States Patent [19]

Kifor

[11] 4,215,459
[45] Aug. 5, 1980

[54] METHOD OF REMOVING HOSE FROM A MANDREL AND A MANDREL ADAPTED TO THE METHOD

[75] Inventor: Harry T. Kifor, Canton, Ohio

[73] Assignee: The Goodyear Tire & Rubber Company, Akron, Ohio

[21] Appl. No.: 959,407

[22] Filed: Nov. 9, 1978

[51] Int. Cl.² ............................................. B65H 81/06
[52] U.S. Cl. .................................... 29/426.1; 29/234; 156/173
[58] Field of Search .................. 29/427, 234; 156/173; 229/87 C

[56] References Cited

U.S. PATENT DOCUMENTS

| | | | |
|---|---|---|---|
| 1,474,363 | 11/1923 | Heineman | 229/87 C X |
| 2,019,401 | 10/1935 | Driver | 229/87 C X |
| 2,361,026 | 10/1944 | Greene | 29/234 X |
| 2,895,867 | 7/1959 | Fourmonoit | 29/427 X |
| 3,336,176 | 8/1967 | Medney | 156/173 |

Primary Examiner—Milton S. Mehr
Attorney, Agent, or Firm—R. S. Washburn

[57] ABSTRACT

A hose built on a non-expanding, non-collapsing mandrel is removed readily lengthwise of and off the mandrel, facilitated by a tube of tough, flexible, thin anti-adherent film disposed in snug fitting contact with the length and girth of the mandrel. The tube is secured to the rigid metal member only close to the end thereof from which the hose is removed. Preferably, the tube is invaginated so as to provide inner and outer slidably juxtaposed walls. The hose built on such mandrel is moved lengthwise together with the outer wall of the tube which slides on the inner wall or the metal member. Lubrication, as by an air film, can facilitate the sliding, and does not contact the hose.

9 Claims, 2 Drawing Figures

METHOD OF REMOVING HOSE FROM A MANDREL AND A MANDREL ADAPTED TO THE METHOD

The present invention has to do with building hose and particularly with methods and apparatus facilitating the removal of the hose from a mandrel on which it has been built.

Hose is commonly built on a mandrel having a diameter suited to the internal diameter of the desired hose and a length equal to or somewhat greater than the length of hose to be built, hose, meaning here any flexible conduit for gas, liquid, or solids in pulverized form or mixtures thereof. The materials of which such hose is built differ widely and are well known. Commonly, such hose includes starting materials which are sheets or strips of uncured but curable elastomers and can be combined with laid cords or wires or woven fabrics of cord or wire for reinforcement. To build a hose, selected materials are wound in predetermined sequence about a mandrel having a hard, generally cylindrical surface of a given diameter and given length corresponding to the inside diameter and length specified for the hose. When the hose is built, it is commonly, although not necessarily, cured while yet on the mandrel. Whether cured or uncured, the hose must be removed from the mandrel on which it has been built before being put into use. Because the uncured curable elastomer of which the hose is built and particularly the elastomer wrapped about in contact with the surface of the mandrel, is tacky and tends to adhere to the mandrel surface, the removal of the completed hose from the mandrel has constituted a continuing and troublesome problem.

Attempts to solve the problem of removal of the hose from a mandrel on which it has been built have included the use of various lubricants and anti-adhesives applied to the surface of the mandrel before any hose building is started. These lubricants or anti-adhesives have been less than fully satisfactory particularly because of the attendant contamination of the hose on and between the layers of materials of which the hose is built. When such contamination occurs, the hose is likely to be of less than desired quality.

Other attempts to facilitate the release and removal of the hose from a mandrel on which it has been built have included attempts to introduce air, water, or other fluids, between and in contact with both the inner surface of the hose and the external surface of the mandrel. These attempts also have been less than fully satisfactory for the reason that even a tolerable expansion of the diameter of the hose often fails to free the hose inner surface entirely from the outer surface of the mandrel, particularly at locally adherent spots which are by-passed by the fluids.

Accordingly, it is a principal object of the present invention to provide an improved method and an improved apparatus for removing hose from the mandrel on which it has been fabricated, whereby the foregoing difficulties can be alleviated.

Another object of the invention is the provision of a mandrel having means adapted to facilitate the removal of hose built thereon.

A further object of the invention is the provision of a method and an apparatus by which the adhesion of hose to the mandrel on which it is built is prevented so as to allow the hose to slip lengthwise off the mandrel without damage to the hose.

Yet another object of the invention is the provision of a method and an apparatus in which a snugly fitting, thin, flexible, evertible tube covers the length and girth of the mandrel and which tube is readily slidable telescopically lengthwise of and off the hard polished surface of the mandrel and which tube is evertible and thereby readily removable from the hose as the hose is removed from the mandrel.

Still another object of the invention is the provision of a mandrel having means facilitating the removal of the hose from the mandrel and which means does not impair the function of the mandrel surface required for effective consolidation of the layers of material of which the hose is built.

A still further object of the invention is the provision of a mandrel having a thin, flexible, anti-adherent film thereon and slidable lengthwise from the mandrel surface and which film is readily restored to position around the mandrel preparing the mandrel for use in building another hose.

Another object of the invention is the provision for removal of hose from the mandrel on which the same has been fabricated which does not require radially inward collapse of the mandrel or other reduction in its diameter to release the hose.

The foregoing objects and advantages are achieved by, before building the hose, covering such mandrel with a thin, tough, flexible film non-adherent to said mandrel and forming a snugly fitting tube overlying the length and girth of the mandrel, securing one end of the tube to an adjacent one end of the mandrel, then after building the hose, moving the tube and the hose together lengthwise relatively oppositely of the mandrel, the relative movement of the hose being toward the secured end of said tube, and concurrently evaginating the tube progressively from the hose.

The foregoing objects and advantages are accomplished also by providing a mandrel for fabricating hose comprising a first member having a hard cylindrical surface of a given girth and length and a second member consisting of a thin, flexible film forming a tube snugly fitting the girth and length of the first member, the tube being secured to the first member only adjacent to the hose removal end of the first member.

Figure 1:
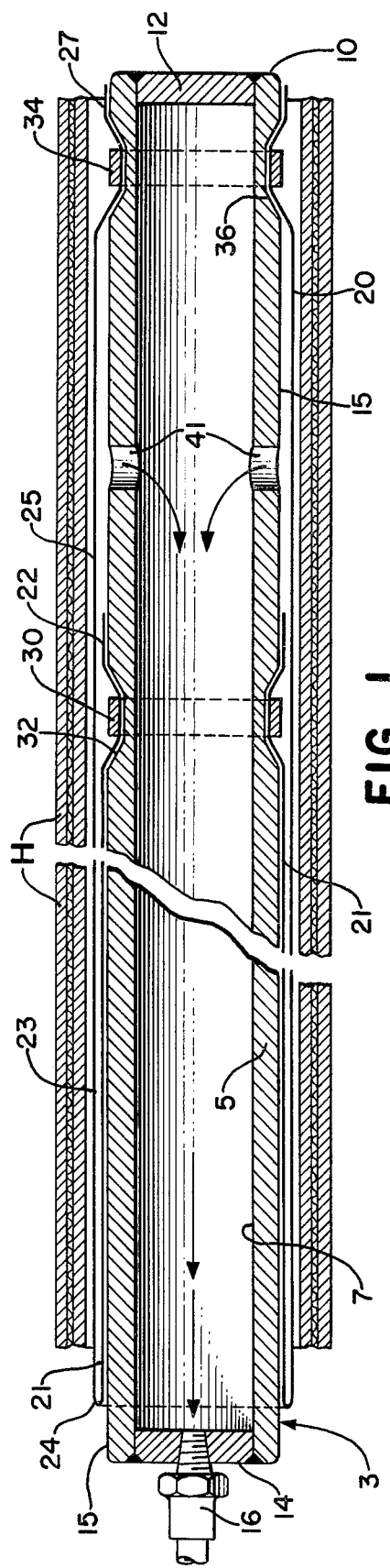
FIG. 1 is a longitudinal sectional view of a mandrel in accordance with the invention showing schematically a hose fabricated thereon.

The mandrel 3, referring to FIG. 1, comprises a rigid, hollow, cylindrical tube 5 of a suitable diameter, girth, corresponding to the given inside diameter of the hose H to be built thereon. The length of the mandrel is at least as great as the given length of the hose to be built thereon and may, for example, be several hundred feet in length.

The mandrel 3 is, preferably though not necessarily, hollow both to reduce the weight of the tube 5 relative to the equivalent solid of like diameter and length, and to provide a passage 7 to permit the flow of a fluid, for example, compressed air. The tube 5 is of steel or aluminum alloy. Other suitable metal, or non-metals, can also be used. The end 10 from which the hose will be removed is closed as by the plate 12 which may be brazed or otherwise fixed airtightly in the end of the passage 7. At its other end 14 the mandrel is adapted to receive a suitable fitting 16 of a conventional type for connection to a supply of fluid at a controlled pressure which may be below, as well as above, atmospheric pressure, as presently will be further disclosed.

The outer cylindrical surface 15, that is, the surface about which the layers of material comprising the hose are wrapped is hard and preferably polished to a smooth regular finish.

According to the present method and apparatus, a thin, flexible, tough, non-adherent film is disposed on the surface 15 in the form of a tube 20 which is invaginated to provide an inner wall 21 which snugly contacts the girth and nearly the entire length of the surface 15 of the metal tube 5 to its terminal edge 22 a small distance from the end 10 and an outer wall 23 overlying in snug contact with the inner wall 21 from the circumferential fold 24 near the end 14 of the metal tube to close to the removal end 10 so that the terminal portion 25 of the outer wall overlies the terminal edge 22 of the inner wall. The terminal edge of the inner wall of the tube is secured to the metal tube by a clamp or garter 30 in a circumferential groove 32 sunk in the cylindrical surface 15 of the metal tube 7 sufficiently to provide level continuity of the surface 15 without interference to the removal of the hose H. The terminal edge 27 of the outer wall is similarly secured by a second clamp 34 or garter in a circumferential groove 36 sunk in the surface 15 sufficiently to provide a continuous level or non-interfering surface.

Between the first groove 32 and the second groove 36 the metal tube 7 is drilled radially as at 41, providing port means by which fluid, such as compressed air, can be introduced between the film of the tube and the outer hard surface of the metal tube. Suction may also be applied to the tube 20 by way of the port means.

The film material which forms the tube is thin, tough, and flexible, so that it can be easily everted, first, as the completed hose is removed lengthwise from the mandrel and, second, so that after being stripped from the hose by inversion or evagination, it can be again everted as the outer wall of the tube is slipped lengthwise over the metal tube, i.e. restored to the condition illustrated in FIG. 1.

The film of the tube must be sufficiently elastic to fit snugly about the hard surface 15 of the metal tube 7 and sufficiently elastic to allow for some radial expansion by fluid pressure therewithin to assist in restoring the tube 20 to its position on the metal tube as shown in FIG. 1. The length of the flexible film tube thus is required to be approximately two times the length of the mandrel or at least two times the length of the mandrel which is used for building hose thereon less only the small space between the first and second clamps. The two layers, namely, the inner and outer walls 21,23 formed by the tube 20 snugly wrapped on the metal tube 7 do not significantly impair the hardness of the surface 15 of the metal tube and, therefore, hose plies or layers can be stitched or otherwise pressed to consolidate the hose in the usual manner as the same is being built.

The thickness of the thin film is at least sufficient to provide reasonable wear life in use and thus depends on the length and girth of the metal tube; at most, the film thickness is less than such as to impair the useful hardness of the surface 15 in use.

Preferably, the flexible tube is made of a film generally referred to as plastic and may be of polyvinylchloride, commonly known as vinyl, or of polyester, or an equivalent. An extruded and cured tube of a suitable rubber compound is also contemplated. It is advantageous that the surfaces of the inner and outer walls 21,23 in contact with each other be or be treated to be not only non-adherent but of relatively minimum friction so that the outer wall can slide easily lengthwise relative to the inner wall.

Since the flexible tube 20 is clamped at both of its ends to the metal tube 7 the closed annular space as defined thereby is isolated from the hose, a suitable lubricant can be used if desired without affecting or contaminating the hose. Lubrication of the film-to-film contact, that is, the inner and outer wall contact, can be effected by compressed air at a pressure sufficient only to provide a thin air layer without significant expansion of the hose so that the air film further facilitates sliding the hose lengthwise off the mandrel.

Figure 2:
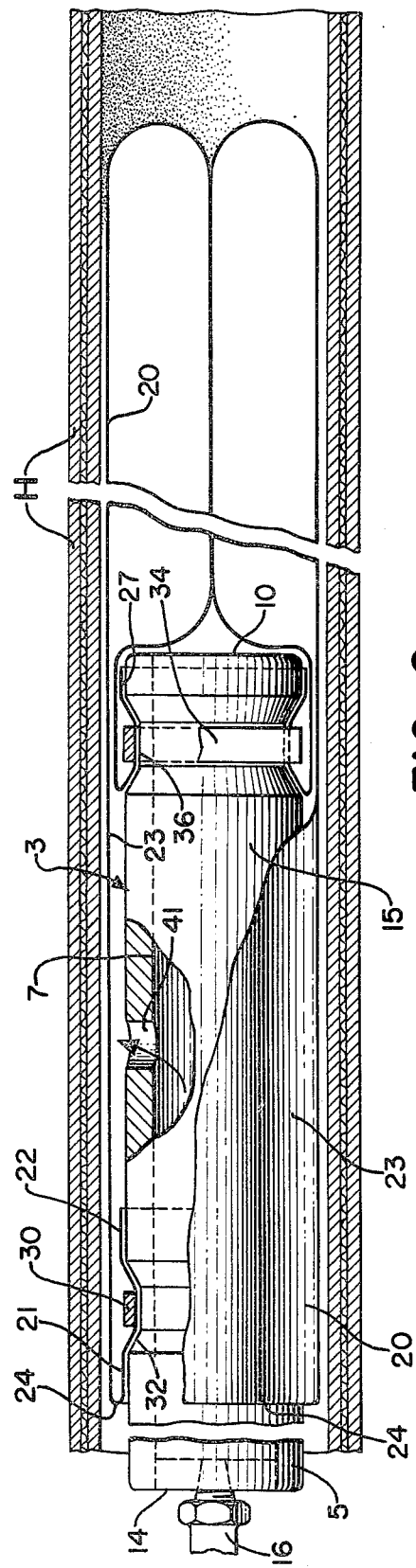
FIG. 2 is a longitudinal cross-sectional view of the mandrel of FIG. 1 illustrating the removal of hose lengthwise thereof in accordance with the invention.

Referring to FIG. 2, as the outer wall 23 of the film tube 20 does not slide relative to the inner surface of the hose, that surface is moved lengthwise from the mandrel together with the outer wall of the flexible film tube. Because the edge 27 of the outer wall is secured to the removal end 10 of the mandrel, the tube is evaginated progressively and is gradually separated radially from the inner surface of the hose without impairing the inner surface of the hose and without requiring the lengthwise force heretofore required to remove hose from the mandrel on which it has been built. Because the outer wall of the tube slides with relative ease on the inner wall, particularly when assisted by the lubrication of a fluid introduced between the inner and outer wall, the inner wall does not slide with respect to the surface of the metal tube but is rather progressively evaginated as the hose is removed. The fold 24 moves lengthwise accordingly relative to the tube 7 at one-half the rate of the outer wall.

Fluid, such as air, under pressure, can be introduced to facilitate the relative movement of the outer wall along the inner wall of the flexible tube but such pressure is preferably not sufficient to materially expand the diameter of the hose but rather only sufficient to form an air film sufficient to separate slightly the outer wall from the inner wall.

Because the tube 20 is closed, a lubricating fluid, other than or in addition to the air, can be introduced between the walls of the tube to facilitate their relative sliding movement without risk of contaminating the hose built on the mandrel so long as the lubricant fluid chosen is compatible with the selected film of which the tube is made.

It should be observed that it is also contemplated within the scope of the invention that the tube of flexible film may comprise only what is referred to herein as the outer wall, omitting the inner wall. Such outer wall then is moved lengthwise together with the hose relative to the metal tube in a similar manner to that discussed above, and that as the hose is moved lengthwise from the mandrel the film is evaginated from the hose by reason of its attachment to the removal end of the metal tube. The lubricant in this option used between the tube 20 and the surface 15 is advisedly limited to air or a fluid harmless to the hose.

The mode of operation will have become apparent from the foregoing description to persons skilled in the art. It can be summarized briefly as follows. The hose can be built on the mandrel by any conventional method using conventional materials. The film placed on the surface of the metal tube of the mandrel is held there by a snug elastic fit around and along its girth and length. It is contemplated also that a below atmospheric pressure may be induced in the passage and in the port means whereby the fit of the flexible tube is held more strongly to the exterior surface of the metal tube.

After the desired hose has been completed, whether cured or not cured, the hose is moved lengthwise relatively of the mandrel toward the removal end. The film, particularly the outer wall thereof, moves together with the hose while the inner wall of the flexible tube remains in snug contact with the metal tube but is rolled progressively, everting itself so that the inner wall progressively becomes an extension of the outer wall. At the same time as the hose is moved lengthwise relative to the mandrel, from the removal end, the outer wall separates progressively radially inwardly as the tube invaginates and is thereby progressively stripped from the inside of the hose.

After the hose is completely separated not only from the metal tube 7 but from the flexible tube 20, fluid such as compressed air is introduced to expand the tube 20 slightly sufficiently to permit its being slipped readily lengthwise of the metal tube, reversing the movement of removing the hose and so replacing the flexible tube in its condition as seen in FIG. 1.

It should be noted also that in some hose, at least, the area difference on which the pressurized fluid acts can supply at least a part of the force required to move the hose relative of and off the mandrel.

Mandrel diameters may range from about 1 inch to 24 inches or more and the length employed may range from 2 feet to several hundred feet, a representative length being from 100 to about 400 feet.

While certain representative embodiments and details have been shown for the purpose of illustrating the invention, it will be apparent to those skilled in the art that various changes and modifications may be made therein without departing from the spirit or scope of the invention.

What is claimed is:

1. The method of removing hose from a hard cylindrical mandrel on which said hose has been built comprising before building said hose covering said mandrel with a thin tough flexible film non-adherent to said mandrel and forming thereon a snugly fitting tube overlying the length and girth of said mandrel, and securing one end of said tube circumferencially to the adjacent one end of said mandrel, then after building said hose moving the tube and the hose together lengthwise relatively oppositely of the mandrel, the relative movement of the hose being toward the secured end of said tube, and concurrently evaginating the tube progressively from the hose.

2. A method of removing hose as claimed in claim 1, further comprising introducing a fluid between the tube and the mandrel at an above atmospheric pressure sufficient only to provide a fluid film between said tube and said mandrel while moving the tube relatively lengthwise of said mandrel.

3. A mandrel for fabricating hose having a given inside diameter and length, said mandrel comprising a first member having a polished hard cylindrical surface of a diameter corresponding to said given diameter and a length not less than said given length, a second member consisting of a thin flexible film forming a tube snugly fitting the diameter and length of said first member over the extent of said surface, one end of said tube being permanently secured to said first member only at the respectively associated end of said first member, said second member being readily slidable longitudinally of the first member for reuse.

4. A mandrel as claimed in claim 3, further comprising port means in said mandrel adjacent to the fixed end of said tube for admitting a fluid at above atmospheric pressure between said tube and said mandrel at above atmospheric pressure sufficient only to provide a fluid film between said tube and said mandrel and passage means in said mandrel for communicating pressurized fluid to said port means.

5. A mandrel for fabricating a hose, said mandrel including means for facilitating removal of said hose lengthwise from said mandrel, said means comprising a tube of flexible thin anti-adherent film disposed about and along the outward surface of said mandrel, said tube being invaginated to form an inner wall and an outer wall, each wall having a terminal edge secured adjacent one end of said surface, said inner wall snugly contacting the length and girth of said surface and said outer wall overlying in snug contact with said inner wall, the edge of said inner wall being spaced from the edge of the outer wall away from said one end, said outer wall being slidable lengthwise of said surface relative to said inner wall and beyond said one end.

6. A mandrel as claimed in claim 5, further comprising port means in said mandrel adjacent to the fixed end of said tube for admitting a fluid at above atmospheric pressure between said tube and said mandrel at above atmospheric pressure sufficient only to provide a fluid film between said tube and said mandrel and passage means in said mandrel for communicating pressurized fluid to said port means.

7. A mandrel as claimed in claims 3, 4, or 5, wherein said thin flexible film comprises an extruded and cured tube of a rubbery elastomer.

8. A mandrel as claimed in claims 3, 4, or 5, wherein said thin flexible film comprises polyvinylchloride.

9. A mandrel as claimed in claims 4, 5, or 6, wherein said mandrel comprises a hollow metal tube having a hard cylindrical polished surface, said hollow tube being closed at one end and having means at its other end for connecting the hollow metal tube to a source of controlled pressure fluid.

* * * * *